(12) United States Patent
Cordeiro et al.

(10) Patent No.: US 10,742,384 B2
(45) Date of Patent: Aug. 11, 2020

(54) HANDSHAKING METHOD AND APPARATUS FOR OFDM SYSTEMS WITH UNKNOWN SUB-CHANNEL AVAILABILITY

(71) Applicant: KONINKLIJKE PHILIPS N.V., Eindhoven (NL)

(72) Inventors: Carlos Cordeiro, Portland, OR (US); Seyed-Alireza Seyedi-Esfahani, Rochester, NY (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/537,199

(22) Filed: Nov. 10, 2014

(65) Prior Publication Data

US 2015/0055615 A1 Feb. 26, 2015

Related U.S. Application Data

(63) Continuation of application No. 11/993,530, filed as application No. PCT/IB2006/052143 on Jun. 27, 2006, now Pat. No. 8,902,820.

(Continued)

(51) Int. Cl.
*H04L 5/00* (2006.01)
*H04L 27/26* (2006.01)

(52) U.S. Cl.
CPC .......... *H04L 5/0058* (2013.01); *H04L 5/0044* (2013.01); *H04L 27/2613* (2013.01); *H04L 5/0007* (2013.01)

(58) Field of Classification Search
CPC . H04L 27/2613; H04L 5/0007; H04L 5/0044; H04L 5/0058
See application file for complete search history.

(56) References Cited

U.S. PATENT DOCUMENTS

| | | | |
|---|---|---|---|
| 7,167,463 B2 | 1/2007 | Alapuranen | |
| 2001/0024427 A1* | 9/2001 | Suzuki | H04W 72/085 370/329 |

(Continued)

FOREIGN PATENT DOCUMENTS

| | | |
|---|---|---|
| CN | 1617530 A | 5/2005 |
| JP | 2005167502 A | 6/2005 |

(Continued)

OTHER PUBLICATIONS

Jenhui Chen et al., "AMNP: Ad Hoc Multichannel Negotiation Protocol for Multihop Mobile Wireless Networks" Communications, 2004 IEEE International Conference on Paris, France Jun. 20-24, 2004, Piscataway, NJ, USA,IEEE, Jun. 20, 2004, vol. 6, pp. 3607-3612, XP010712375

(Continued)

*Primary Examiner* — Kodzovi Acolatse
*Assistant Examiner* — Farhad Ali

(57) ABSTRACT

A method and device for determining available communication sub-channels in an OFDM communication system is disclosed. The method comprises the steps of transmitting, on at least one first sub-channel, information regarding sub-channels available for a first transmission of at least one first data packet, receiving, on at least one second sub-channel, information regarding sub-channels available for a second transmission, determining at least one set of available sub-channels based on the information regarding the first and second transmissions. In one aspect of the invention, at least one set of the determined available sub-channels is further provided to a receiving system. The information is being provided in a separate transmission, or within a data packet, or within each subsequent data packet or in selected data packets.

12 Claims, 5 Drawing Sheets

Related U.S. Application Data

(60) Provisional application No. 60/694,562, filed on Jun. 28, 2005.

(56) References Cited

U.S. PATENT DOCUMENTS

| | | | | |
|---|---|---|---|---|
| 2004/0047296 | A1* | 3/2004 | Tzannes | H04L 1/0028 370/252 |
| 2004/0125881 | A1* | 7/2004 | Qiu | H04L 27/28 375/260 |
| 2004/0223511 | A1 | 11/2004 | Tzannes | |
| 2004/0240535 | A1* | 12/2004 | Verma et al. | 375/222 |
| 2005/0152473 | A1* | 7/2005 | Maltsev | H04L 27/26 375/299 |
| 2005/0169231 | A1* | 8/2005 | Bennett | 370/347 |
| 2005/0180374 | A1* | 8/2005 | Balachandran et al. | 370/343 |
| 2006/0281465 | A1* | 12/2006 | McBeath | H04W 48/08 455/450 |

FOREIGN PATENT DOCUMENTS

| | | |
|---|---|---|
| WO | WO2002091651 A2 | 11/2002 |
| WO | WO2005043832 A1 | 5/2005 |

OTHER PUBLICATIONS

Angel Lozano et al: "Integrated Dynamic Channel Assignment and Power Control in TDMA Mobile Wireless Communication Systems", IEEE Journal on Selected Areas in Communications, IEEE Service Center, Piscataway, US, vol. 17, No. 11, Nov. 1999, pp. 2031-2040, XP011055041

Jain et al., "A Multichannel CSMA MAC Protocol with Receiver-Based Channel Selection for Multihop Wireless Networks", Proceedings or Tenth International Conference on Computer Communications and Networks, 2001, pp. 432-439.

Dipankar Raychaudhuri: "Wireless ATM Networks: Technology Status and Future Directions" Proceedings of the IEEE, IEEE, New York, US, vol. 87, No. 10, Oct. 1999 (Oct. 1999), XP011044281.

* cited by examiner

HANDSHAKING METHOD AND APPARATUS FOR OFDM SYSTEMS WITH UNKNOWN SUB-CHANNEL AVAILABILITY

CROSS-REFERENCE TO RELATED APPLICATIONS

This application is a Continuation of U.S. patent application Ser. No. 11/993,530, filed Dec. 21, 2007, which claims priority under 35 U.S.C. § 119(e) from provisional U.S. patent application No. 60/694,562, filed Jun. 28, 2005, the contents of each of which are incorporated herein by reference.

This invention relates to the field of communications and, more specifically, to a method and apparatus for implementing a handshake in OFDM systems.

Wireless communication systems have been experiencing an explosive growth. From local wireless access networks to cellular telephone systems, wireless communications are allocated increasingly more frequency spectrums. However, such allocation is static and known to be frequency-spectrum inefficient. In the United States, Canada, and Europe, spectrum policy is undergoing radical rethinking. For example, the U.S. Government has recently established a spectrum policy initiative with a mandate to issue recommendations on how to better manage the spectrum. This has led the wireless communication industry to investigate innovative approaches for opening the radio spectrum by allowing opportunistic usage of the unused radio resources. This new and novel use of the radio spectrum, referred to as Spectrum Agile Radios (SARA) or Cognitive Radios (CR), would allow the reuse of a vacant spectrum without causing harmful interference to existing users.

Hence, future wireless communication systems such as cognitive radios will either be deployed in frequency bands already allocated—i.e., licensed to primary users or may operate in unlicensed portions of the frequency spectrum. In these licensed and/or unlicensed environments, these advanced wireless systems are expected to communicate only in a vacant spectrum not used by primary users of already existing wireless systems. However, since primary users occupy their allocated frequency channels in a time-varying manner, with no coordination of transmission in different channels, the availability of vacant or unused channels to other users varies with time. Such users are those who use a frequency spectrum on an opportunistic basis and one that may be based on cognitive radio techniques.

To date, it is commonly agreed that OFDM seems to be the most appropriate transmission scheme for these highly dynamic environments, as it enables the definition of a number of sub-channels that can be configured to be on or off depending upon channel usage.

However, a major problem with such opportunistic techniques is how to determine channels that are available for both the transmitter and the receiver to allow for communication. In addition, this determination must be made in real-time as the time-varying nature of the channel usage precludes a static channel allocation.

Hence, a need exists in the industry for a system and method for dynamically determining a transmission/receiver channel assignment in OFDM-based systems.

A method and device for determining available communication sub-channels in an OFDM communication system is disclosed. The method comprises the steps of transmitting, on at least one first sub-channel (207), information (210) regarding sub-channels available for a first transmission of at least one first data packet (245), receiving, on at least one second sub-channel (250), information (225) regarding sub-channels available for a second transmission, determining at least one set of available sub-channels based on the information regarding the first and second transmissions (430). In one aspect of the invention, at least one set of the determined available sub-channels is further provided to a receiving system. The information regarding the availability of sub-channels is being provided in a separate transmission, or within a data packet, or within each subsequent data packet or in selected ones of the data packets.

FIG. 1 illustrates a typical allocation of a frequency spectrum;

FIGS. 2A and 2B collectively illustrate an exemplary transmitter/receiver handshake in accordance with the principles of the invention;

Figure 1:
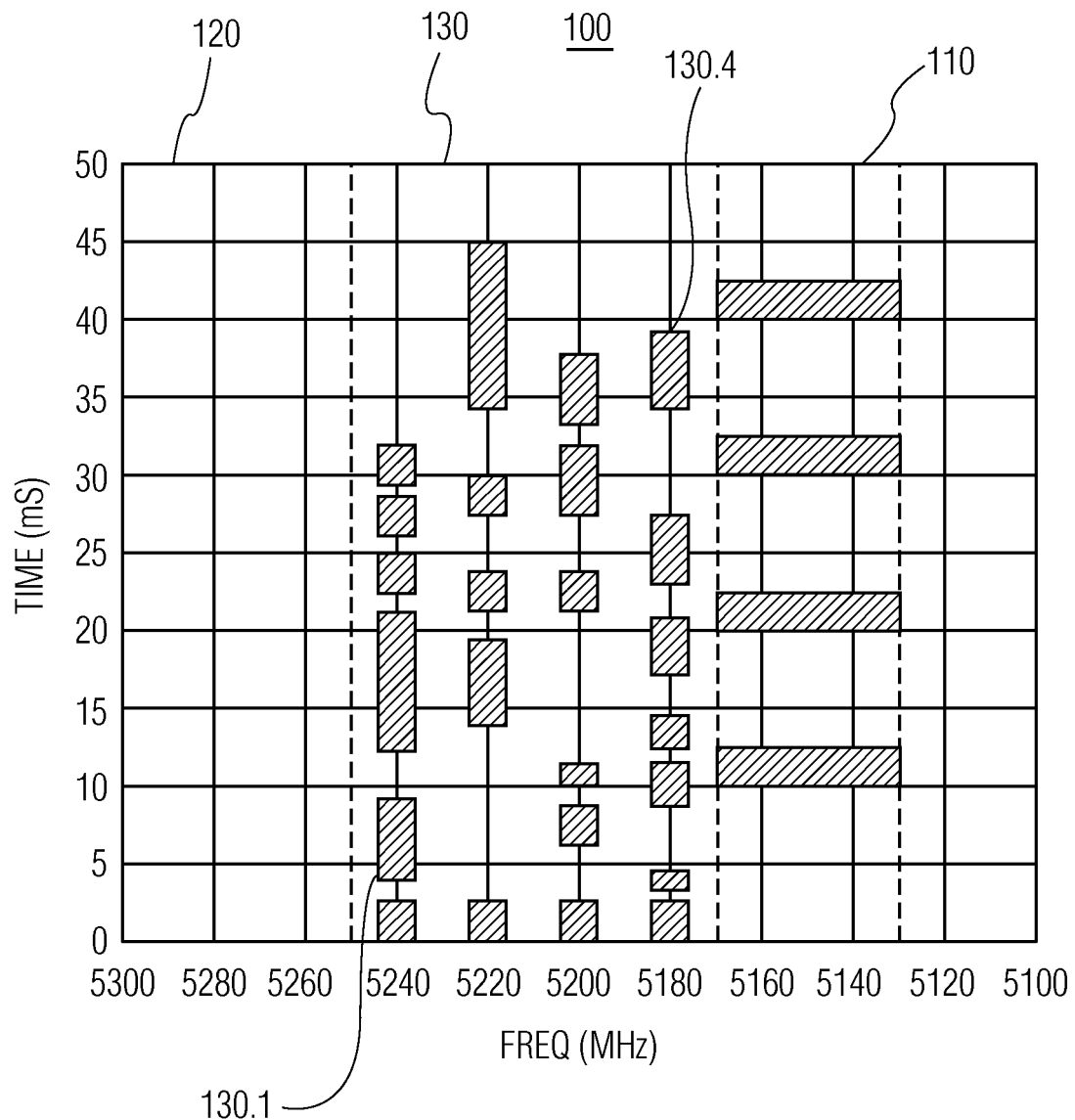

It is to be understood that these drawings are for purposes of illustrating the concepts of the invention and are not drawn to scale. It will be appreciated that the same reference numerals, possibly supplemented with reference characters where appropriate, have been used throughout to identify corresponding parts.

FIG. 1 illustrates a typical allocation and usage of frequency spectrum 100 wherein a licensed channel 110, having a deterministic pattern of usage, is shown in the frequency range 5,130 through 5,170 MHz and a second licensed frequency range 120 in the range of 5,250 to 5,300 MHz, wherein no channels are allocated. Also shown is the heavily utilized unlicensed frequency range 130 between 5,170 and 5,250 MHz. In this unlicensed frequency range four channels 130.1-130.4, each of 20 MHz, are shown. As would be recognized, the usage of these four channels is non-deterministic and time varying, as neither their length of time or period of transmission is fixed or known.

Figure 2A:
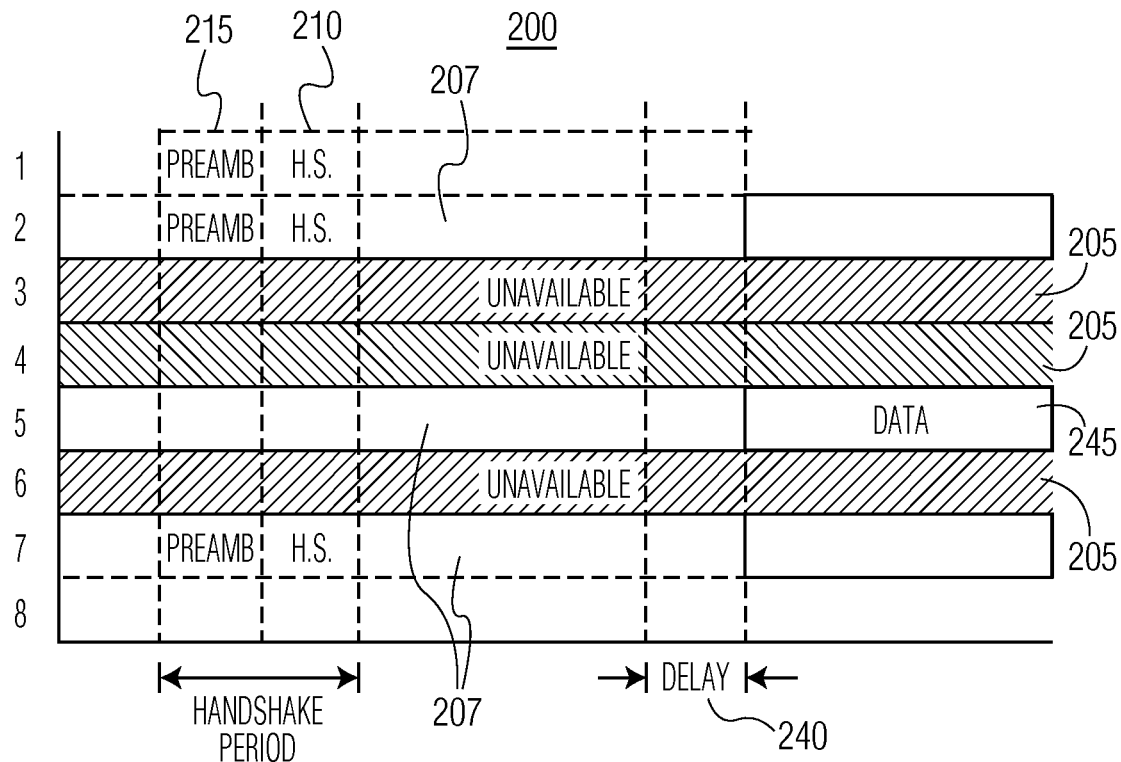
Figure 2B:
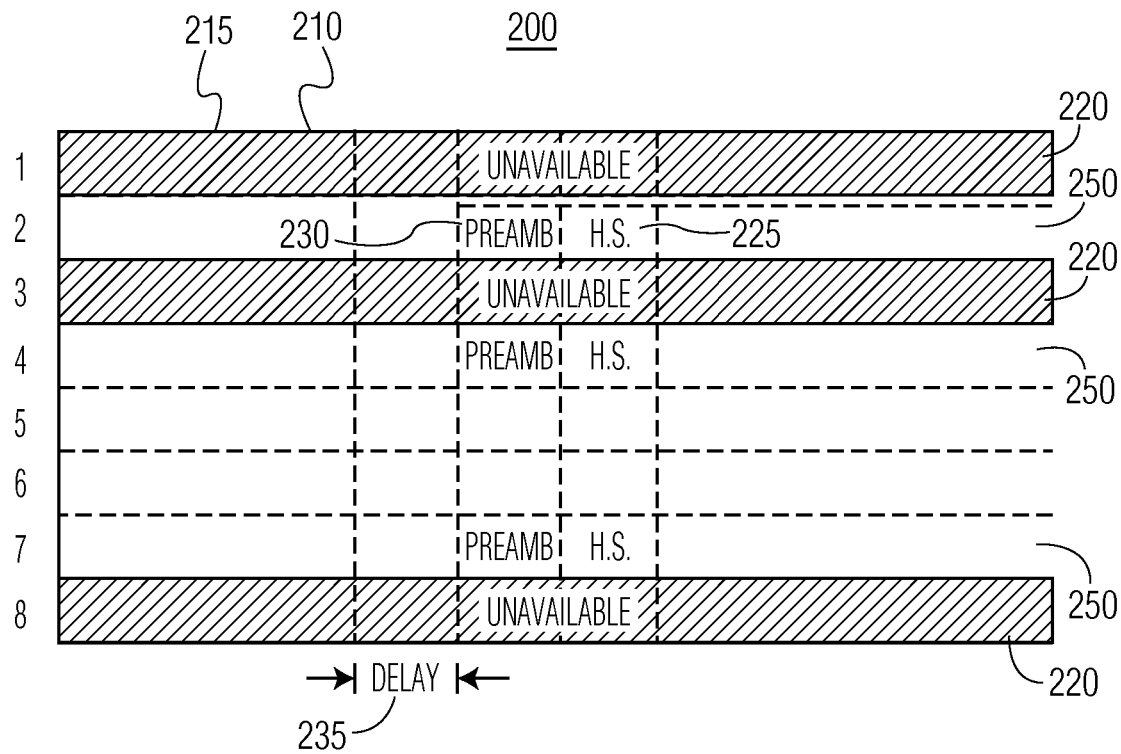

FIGS. 2A and 2B collectively illustrate an example of the handshaking protocol in accordance with the principles of the invention for a system having a total of eight sub-channels, referred to as 1-8. FIG. 2A illustrates the usage of periods 210 of sub-channels, 1, 2 and 7, 207 by the transmitter for performing a handshake. Further illustrated are sub-channels 3, 4 and 6, 205 that are unavailable for transmission.

In this illustrated example, in order for the transmitter to establish a communication with the receiver, the transmitter selects a subset or all of the vacant sub-channels and transmits multiple copies of the handshake packet in parallel or substantially concurrently on all selected sub-channels. In one aspect of the invention, which is shown in FIG. 2A, an, optional, known preamble packet may be transmitted in a period 215 prior to the beginning of the handshake packet 210. The use of the preamble packet is advantageous in that it provides information that a receiver may use to determine that a handshake packet is available. In another aspect, to determine the existence of handshake data, in the absence of a preamble packet, an error-detecting code such as a Cyclic Redundancy Check (CRC) may be utilized. In another aspect of the invention, copies of the handshake packet may be transmitted on different sub-channels modulated with the predetermined appropriate phases.

The receiver, after distinguishing signal from noise, on at least one of the sub-channels employed by the transmitter, decodes the information in the handshake packet received on the transmitted channels. The information in the received handshake packet includes information regarding those sub-channels upon which the transmitter is able and/or willing to operate.

If the receiver is able to detect handshake data on more than one sub-channel, the receiver may use a combining method to improve the reliability of the operation.

If there are any channels available at the receiver, the receiver will provide a response using a similar technique to inform the transmitter of the receiver's local channel information, such as availability. FIG. 2B illustrates an exemplary case wherein channels 1, 3 and 8, 220, are determined to be unavailable and, hence, a handshake response is provided in a time period 225 on channels 2, 4 and 7, 250. Also illustrated is the transmission of an optional preamble packet in time period 230 prior to the transmission of the handshake packet.

The transmitter, upon receiving the handshake packet from the receiver, may then determine at least one combination of sub-channels that are available to both the transmitter and the receiver to operate on, and may send data packets 245 using OFDM over the determined sub-channels (i.e., sub-channels 2, 5 and 7 in FIG. 2A). As would be appreciated, different sets of common sub-channels may be used for each direction of communication. With the channel information known the receiver is able to receive and transmit information from and to the transmitter.

As shown, the data packets 245 may be transmitted subsequently after a known delay that compensates for tasks such as local processing or for transitioning from receive to transmit.

Figure 3:
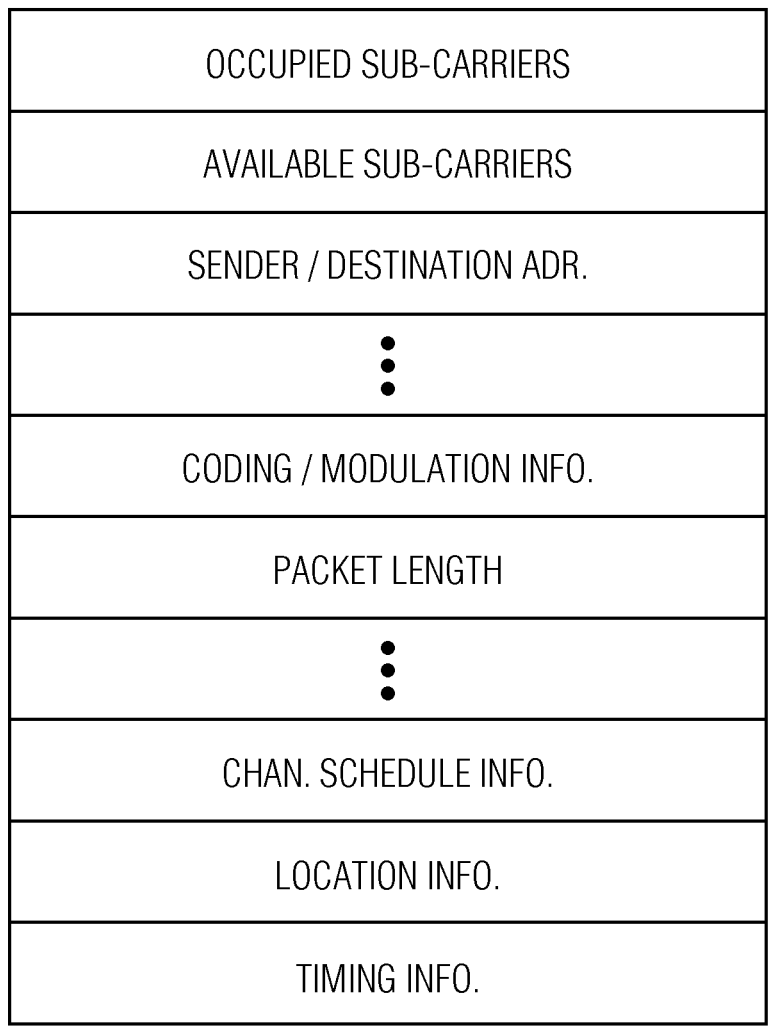
FIG. 3 illustrates an exemplary handshake packet in accordance with the principles of the invention.

FIG. 3 illustrates an exemplary handshake packet in accordance with the principles of the invention. In this illustrated example, information regarding occupied sub-channels, potential sub-channels for transmission/reception, sender and/or destination address, coding and/or modulation information, packet length, channel scheduling information, location information, timing information—i.e. a time that the sub-channel information is valid, etc., may be included in the handshake packet.

Figure 4:
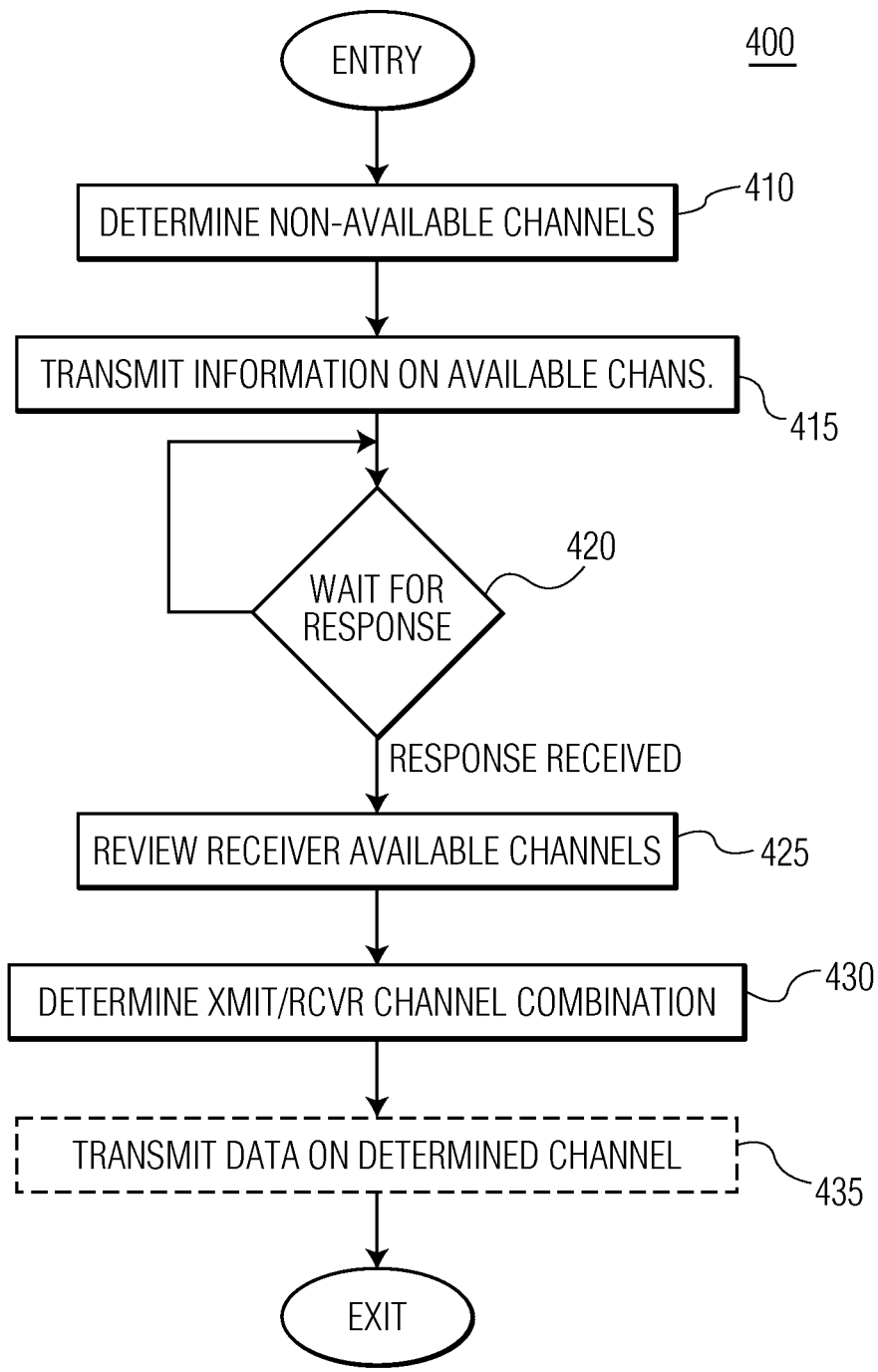
FIG. 4 illustrates a flow chart of an exemplary process for executing a transmitter/receiver handshake in accordance with the principles of the invention.

FIG. 4 illustrates a flowchart of an exemplary process 400 for determining transmitter/receiver channels in accordance with the principles of the invention. In this exemplary process, at block 410, a determination is made of the non-available channels. At block 415, the handshake information is transmitted over the available sub-channels. As previously discussed a preamble may also be transmitted to assist the receiver in determining that handshake information is being transmitted. At block 420, the transmitter awaits a response from the receiver.

When a response is received, the transmitter reviews the provided information regarding the availability of receiver channels, at block 425. At block 430, a determination is made regarding transmitter and receiver channels. This may also include information regarding the transmitter/receiver channels and the duration (i.e., time) each channel is available. In one aspect, the determination of available sub-channels may be determined as the union of available sub-channels associated with the transmitter and the receiver. In another aspect, the determination of available sub-channels may be made based on the time of validity for associated sub-channels.

The transmitter may transmit information regarding the sub-channel allocation data to the receiver at block 435. In another aspect, the transmitter may transmit a data packet, which may include information regarding the sub-channel allocation to the receiver.

Figure 5:
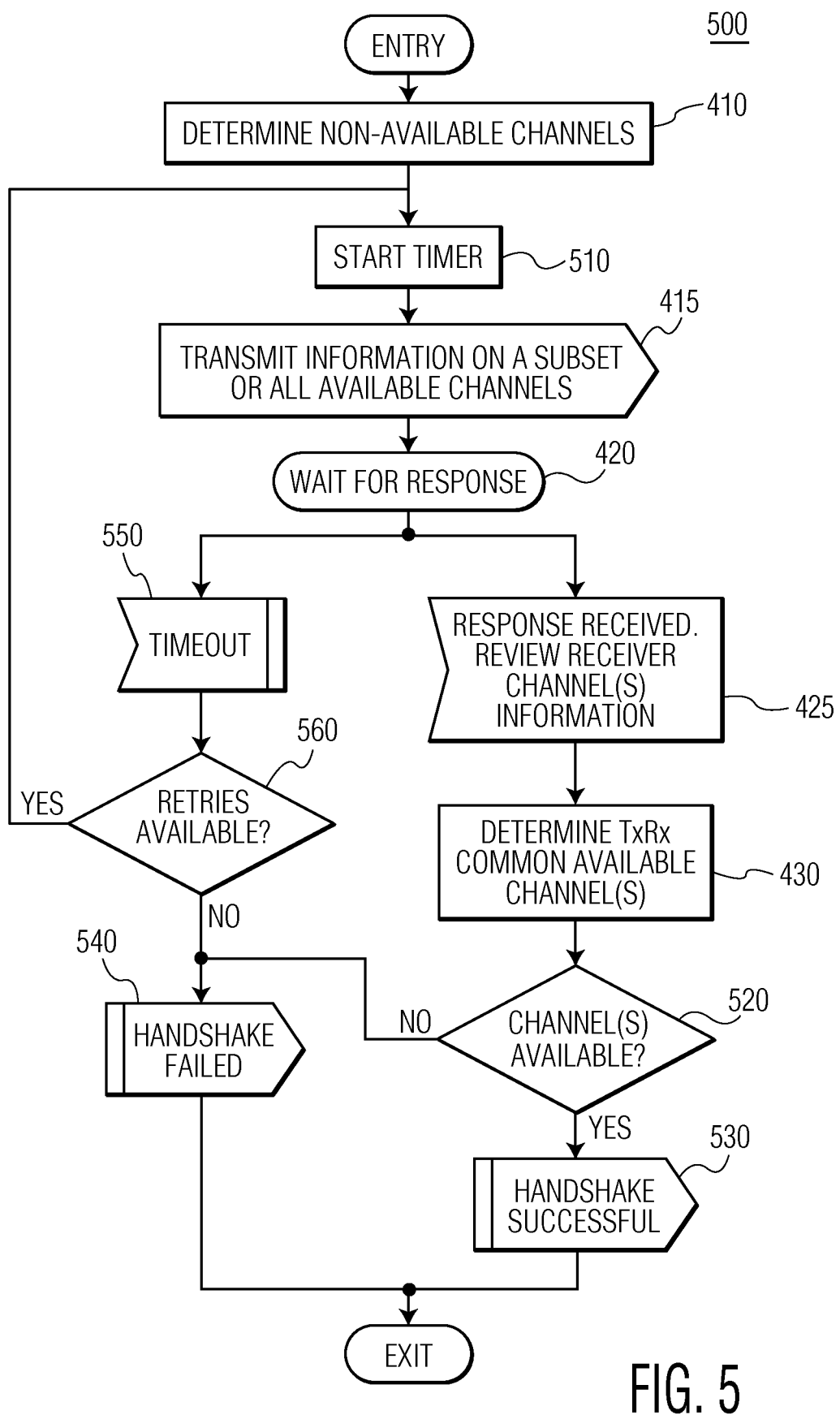
FIG. 5 illustrates a flow chart of a second exemplary process for executing a transmitter/receiver handshake in accordance with the principles of the invention.

FIG. 5 illustrates a second exemplary process 500 for determining transmitter/receiver channels in accordance with the principles of the invention. In this exemplary process a determination is made at block 410 for available channels, similar to the process described in FIG. 4. At block 510 a timer is started, which may be used to provide a finite time for a receiver to respond to a transmitted handshake. At block 415, handshake information is transmitted, similar to the process described in FIG. 4. At block 420, the transmitter awaits a response from the receiver. In this case, when a response is received, a process continues at block 425, wherein a review of the received receiver channel information is preformed. At block 430, available transmitter/receiver channel combinations are determined. At block 520, a determination is made whether available channel combinations are determined. If the answer is in the affirmative, then an indication of a successful handshake is made. Otherwise, an indication is made, at block 540, that the handshake has failed.

Returning to the wait state at block 420, if no response is received in the allocated time period, block 550, a determination is made at block 560 whether it is acceptable to re-try the handshake process. If the answer is in the affirmative, then the process continues at block 510, wherein the process is repeated. However, if the answer is in the negative, then an indication is made, at block 540, that the handshake has failed.

A system according to the invention can be embodied as hardware, a programmable processing or computer system that may be embedded in one or more hardware/software devices, loaded with appropriate software or executable code. The system can be realized by means of a computer program. The computer program will, when loaded into a programmable device, cause a processor in the device to execute the method according to the invention. Thus, the computer program enables a programmable device to function as the system according to the invention.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method of handshaking between transceivers in an OFDM communication system, comprising:
    transmitting by a first transceiver a first handshake packet,
        wherein the first handshake packet comprises a first field, a second field and a third field,
        wherein the first field indicates occupied sub-channels,
        wherein the second field indicates available sub-channels of a plurality of sub-channels,
        wherein the third field indicates a time that the available sub-channels are valid, wherein the plurality of sub-channels are associated with the first transceiver on at least one available sub-channel of the plurality of sub-channels;

transmitting by a second transceiver a second handshake packet, wherein the second handshake packet comprises a fourth field, a fifth field and a sixth field, wherein the fourth field indicates occupied sub-channels, wherein the fifth field indicates available sub-channels associated with the second transceiver;

wherein the sixth field indicates a time that the available sub-channels associated with the second transceiver are valid, and determining a common set of available sub-channels and duration for transmitting and receiving between the first transceiver and the second transceiver based on the first handshake packet and the second handshake packet, wherein the first handshake packet and the second handshake packet carry only control information.

2. The method as recited in claim 1, further comprising: transmitting a preamble packet prior to transmitting the first handshake packet.

3. The method as recited in claim 1, further comprising: receiving the second handshake packet at the first transceiver.

4. The method as recited in claim 3, further comprising: receiving a preamble packet prior to receiving the second handshake packet.

5. The method as recited in claim 1, wherein the first handshake packet and the second handshake packet include a time of validity.

6. The method as recited in claim 1, wherein the first handshake packet is transmitted by the first transceiver substantially concurrently on each of the available sub-channels of the plurality of sub-channels associated with the first transceiver.

7. The method as recited in claim 1, wherein the first handshake packet and second handshake packet include a time of validity.

8. The method as recited in claim 1, wherein the first transceiver is configured to transmit the first handshake packet substantially concurrently on each of the available sub-channels of the plurality of sub-channels associated with the first transceiver.

9. An OFDM communication system including a plurality of transceivers and a plurality of communication sub-channels, the system comprising:

a first transceiver configured to transmit a first handshake packet, wherein the first handshake packet comprises a first field, a second field and a third field, wherein the first field indicates occupied sub-channels, wherein the second field indicates available sub-channels of a plurality of sub-channels, wherein the third field indicates a time that the available sub-channels are valid, wherein the plurality of sub-channels are associated with the first transceiver on at least one available sub-channel of the plurality of sub-channels; and a second transceiver configured to transmit a second handshake packet, wherein the second handshake packet comprises a fourth field, a fifth field and a sixth field, wherein the fourth field indicates occupied sub-channels, wherein the fifth field indicates available sub-channels associated with the second transceiver;

wherein the sixth field indicates a time that the available sub-channels associated with the second transceiver are valid, wherein the plurality of sub-channels are associated with the second transceiver, wherein the first transceiver is further configured to determine a common set of available sub-channels and duration for transmitting and receiving between the first transceiver and the second transceiver based on the first handshake packet and the second handshake packet, wherein the first handshake packet and the second handshake packet carry only control information.

10. The system as recited in claim 9, wherein the first transceiver is configured to transmit a preamble packet prior to transmitting the first handshake packet.

11. The system as recited in claim 9, wherein the first transceiver is configured to receive the second handshake packet.

12. The system as recited in claim 11, wherein the first transceiver is configured to receive a preamble packet prior to receiving the second handshake packet.

\* \* \* \* \*